United States Patent [19]

Thompson

[11] 4,083,815

[45] Apr. 11, 1978

[54] POLYURETHANE COATING COMPOSITIONS AND PROCESS OF PREPARATION

[75] Inventor: Edward J. Thompson, Watertown, Conn.

[73] Assignee: The Upjohn Company, Kalamazoo, Mich.

[21] Appl. No.: 666,087

[22] Filed: Mar. 11, 1976

[51] Int. Cl.$^2$ .................. C08K 5/11; C08G 18/12; C08G 18/65

[52] U.S. Cl. .................. 260/31.2 N; 260/31.4 R; 260/32.8 N; 260/33.2 R; 260/33.4 UR; 260/33.6 UB; 260/75 NC; 260/75 NB; 260/77.5 MA; 260/75 NE; 260/77.5 AA

[58] Field of Search .............. 260/2.5 AM, 77.5 MA, 260/77.5 AA, 77.5 A, 31.2 N, 31.4 R, 75 NH

[56] References Cited

U.S. PATENT DOCUMENTS

| | | | |
|---|---|---|---|
| 2,884,340 | 4/1959 | Loshaek | 260/75 NE |
| 3,012,984 | 12/1961 | Hudson | 260/31.4 R |
| 3,015,650 | 1/1962 | Schollenberger | 260/75 NP |
| 3,178,300 | 4/1965 | Gemeinhoudt et al. | 260/2.5 AM |
| 3,294,713 | 12/1966 | Hudson et al. | 260/2.5 AM |
| 3,384,624 | 5/1968 | Haiss | 260/2.5 AM |
| 3,405,077 | 10/1968 | Pastor et al. | 260/2.5 AM |
| 3,632,845 | 1/1972 | Brownsword | 260/75 NH |
| 3,635,907 | 1/1972 | Schulze et al. | 260/77.5 AA |
| 3,641,199 | 2/1972 | Niederhauser et al. | 260/859 R |
| 3,686,140 | 8/1972 | Gruber et al. | 260/75 NH |
| 3,875,086 | 4/1975 | Ramey et al. | 260/77.5 MA |
| 3,915,923 | 10/1975 | Ward | 260/77.5 AA |

OTHER PUBLICATIONS

DOS 2418075, Oct. 30, 1975, Bayer A/G, 25 pages, 1 sheet drawing.

*Primary Examiner*—H.S. Cockeram
*Attorney, Agent, or Firm*—Denis A. Firth; John Kekich

[57] ABSTRACT

Polyurethane elastomers are described which are not themselves soluble in organic polar solvents at ambient temperatures but which, upon heating to 140° – 180° C in the presence of said solvents, form solutions which are stable at ambient temperatures. The elastomers are obtained by reacting 4,4'-methylenebis(phenyl isocyanate) with a polyester of polyether diol (M. W. = 750 to 2000) and diol extender in the presence of a monohydric alcohol (M. W. = 32 to 500). The elastomers generally have softening points in the range of 140° C to 180° C.

Coating compositions derived from the above elastomers are also described.

14 Claims, No Drawings

POLYURETHANE COATING COMPOSITIONS AND PROCESS OF PREPARATION

BACKGROUND OF THE INVENTION

1. Field of the Invention

This invention relates to elastomers and to coating compositions prepared therefrom and is more particularly concerned with polyurethane elastomers, with methods for their preparation and with methods for the preparation of coating compositions therefrom.

2. Description of the Prior Art

Polyurethane elastomers which are soluble in organic solvents, and are accordingly useful in the preparation of coating compositions, are well-known in the art. It has not been found possible to prepare a substantially completely cured solid polyurethane elastomer which has good physical properties, such as tensile strength, elasticity, and the like, and which is also sufficiently soluble in organic solvents to be useful in the preparation of coating compositions to be employed as paints, sealants, adhesives and the like.

Thus, in order to achieve a solvent soluble polyurethane elastomer it was generally necessary to employ low NCO/OH indexes, i.e. 0.95:1 or even lower. The physical properties of such products are poor and are reflected in the behaviour of coating compositions prepared therefrom.

Accordingly, many of the polyurethane elastomer coating compositions which are presently available comprise solutions of isocyanate-terminated prepolymers which are cured at the time of application, either by addition to an extender immediately prior to application, or by exposure to atmospheric moisture after application. It is only in the curing stage that the "hard" segments of the polyurethane elastomer are introduced. The introduction of these segments at any earlier stage reduces the solvent solubility of the product to unacceptable levels.

In preparing such isocyanate-terminated polyurethane prepolymers for use in coating compositions, monohydric alcohols and like chain terminators are frequently used to control viscosity, hardness and like properties; see, for example, U.S. Pat. Nos. 3,384,623; 3,350,361; 3,823,111; 3,761,439; and 3,483,167. The use of chain terminators in the preparation of polyurethane elastomers in the presence of organic solvents, i.e. the preparation of coating compositions without isolation of the solid polymer, has been described; see, for example, U.S. Pat. No. 3,425,973. However, it is found that such techniques do not give polyurethanes of reproducibly consistent properties and, accordingly, such techniques are not useful commercially where consistency of product properties from batch to batch is essential.

The use of chain terminators of the above types, including relatively high molecular weight monohydric alcohols, in the preparation of polyurethane elastomers to control hardness therein is also known in the art; see, for example, U.S. Pat. Nos. 3,272,098 and 3,875,086. However, the products in question are not solvent-soluble and are not shown to be capable of conversion to solvent soluble materials and hence to be useful in solvent containing coating compositions.

Very recently a process has been described (U.S. Pat. No. 3,887,525) for the preparation of solvent-soluble polyurethane elastomers which process involves heating, at 180° to 220° C, a polyurethane derived by reacting a diol extender with an isocyanate-terminated prepolymer obtained from a diisocyanate and a polypropylene glycol. In a preferred embodiment of the process the heating step is coupled with mechanical working, e.g. extrusion, of the polyurethane. The process is said to render the polyurethane soluble in "powerful" solvents by which are meant dimethylformamide, dimethylacetamide and dimethylsulfoxide none of which is conventionally employed (because of toxicity considerations) in a coating composition.

It has now been found that substantially completely cured polyurethane elastomers can be prepared which, although not themselves soluble at ambient temperatures in polar organic solvents such as those commonly employed in coating compositions, can be readily converted to a form in which they will pass into solution in said solvents. Further, the physical properties of the polyurethane elastomers in question do not deteriorate significantly as a result of the processing and the resulting coating compositions possess highly advantageous properties.

SUMMARY OF THE INVENTION

This invention comprises an elastomeric polyurethane which is substantially insoluble in organic solvents at ambient temperatures but which, upon heating at 100° C to 180° C in the presence of an organic polar solvent, forms solutions therein which are stable at ambient temperatures, said polyurethane being the product of reaction of:

(a) 4,4'-methylenebis(phenyl isocyanate);
(b) a polyol having a molecular weight in the range of about 750 to about 2000 and being selected from the class consisting of polyester diols and polyether diols;
(c) an aliphatic diol extender; and
(d) a monohydric alcohol having a molecular weight in the range of about 32 to about 500;

wherein the ratio of equivalents of isocyanate to total equivalents of hydroxyl in the components (b), (c), and (d) is within the range of 0.99:1 to 1.06:1 and wherein the proportion of equivalents of component (d) to equivalents of diisocyanate (a) is within the range of about 0.10:1 to about 0.01:1.

This invention also comprises coating compositions which are obtained by heating the above polyurethanes to a temperature in the range of about 100° C to about 180° C in the presence of an organic polar solvent.

The term "softening point" as used throughout the specification and claims means the temperature at which a sample of the polyurethane elastomer first deforms in a non-elastic manner when squeezed between glass plates.

The term "ambient temperature" means the temperature of the environment surrounding the polyurethane composition under storage conditions. This temperature will obviously vary depending upon a variety of factors such as geographic location of warehouse facilities and manufacturing plants in which the polyurethane elastomer or the coating compositions derived therefrom are subjected to storage or processing. Generally speaking, ambient temperatures can range from as low as about 0° C to as high as about 30° C or even higher in tropical or subtropical climates.

DETAILED DESCRIPTION OF THE INVENTION

The polyurethane elastomers of the invention can be prepared by processes conventional in the art for the synthesis of polyurethane elastomers provided the choice of reactants and the proportions thereof are in accordance with the requirements discussed below. The conventional preparative processes include the one-shot procedure in which all the reactants are brought together simultaneously, and the prepolymer procedure in which the isocyanate is reacted with a portion of the polyol in a first step and the isocyanate-terminated prepolymer so produced is subsequently reacted with the remainder of the polyol or extender. The one-shot method is the preferred procedure for preparing the elastomeric polyurethanes of the invention. In a most preferred embodiment, the elastomeric polyurethanes of the invention are prepared by a continuous one-shot procedure such as that set forth in U.S. Pat. No. 3,642,964.

The polyols which are employed in the preparation of the elastomers of the invention can be any polymeric diol provided the molecular weight is within the range of about 750 to about 2000 and preferably is of the order of 1000. Illustrative of polymeric diols are polyester diols and polyether diols having molecular weights within the aforesaid range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the aliphatic glycols containing from 2 to 10 carbon atoms, inclusive, such as ethylene glycol, propane-1,3-diol, 2,2-dimethylpropane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are prepared by polymerizing the appropriate caprolactone with the appropriate difunctional initiator such as an aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of ε-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol, 1,4-butanediol, 2,3-butanediol, 1,5-pentanediol, 1,2-hexanediol, diethanolamine, resorcinol, catechol, bis(p-hydroxyphenyl)methane, diethylene glycol, dipropylene glycol, and the like.

Particularly preferred polyether diols are copolymers of ethylene oxide and propylene oxide containing approximately 50 percent primary hydroxyl groups.

The aliphatic diol extenders employed in preparing the polyurethane elastomers of the invention can be any of the known aliphatic diols having from 2 to 6 carbon atoms, inclusive, such as ethylene glycol, 1,3-propanediol, 1,4-butanediol, 2,2-dimethyl-1,3-propanediol, diethylene glycol, dipropylene glycol, 2,3-dibromo-1,4-butanediol, 2,2-di(bromo methyl)-1,3-propanediol, 1,2-dibromoethylene glycol, and the like. A preferred group of diol extenders are those which contain branched aliphatic chains of which 2,2-dimethyl-1,3-propanediol; dipropylene glycol, and 2,2-di(bromo methyl)-1,3-propanediol are typical examples.

The monohydric alcohol employed as chain terminator in preparing the polyurethane elastomers of the invention can be any compound which contains a single aliphatic hydroxyl group reactive with an isocyanate group, and which is free from other substituents which react with isocyanate or otherwise interfere with the desired reaction, and which has a molecular weight within the range of 32 to 500. Illustrative of such monohydric alcohols are primary or secondary lower aliphatic alcohols such as methanol, ethanol, isopropanol, butanol, amyl alcohol, hexyl alcohol, octanol, decyl alcohol, tribromoneopentyl alcohol, methacrylyl alcohol, 2-hydroxyethyl methacrylate, 2-hydroxypropyl methacrylate, allyl alcohol, vinyl alcohol, ethoxyethanol, the ethyl, propyl, butyl, hexyl and like alkyl ethers of diethylene glycol, and dipropylene glycol and the like; cyclic alkanols such as cyclobutanol, cyclopentanol, cyclohexanol, methylcyclohexanol, cycloheptanol, cyclooctanol, and the like; araliphatic alcohols such as benzyl alcohol, phenylethanol, 3-phenylpropanol, benzhydryl alcohol and the like, including also araliphatic alcohols containing phenolic groups which are hindered by neighboring groups to such an extent that the phenolic group is relatively unreactive with isocyanate groups. Illustrative of araliphatic alcohols containing hindered phenolic groups are 3,5-di-t-butyl-4-hydroxybenzyl alcohol, 4-(3,5-di-t-butyl-4-hydroxyphenyl)butanol, 2-(3,5-di-t-butyl-4-hydroxyphenoxy)ethanol, and the like. A preferred group of monohydric alcohols are ethoxyethanol, n-butanol and n-propanol.

The proportions, in which the various reactants are employed in preparing the polyurethane elastomers of the invention, are important. Thus, the ratio of equivalents of isocyanate to the combined total of equivalents of hydroxyl in the polymeric diol, the diol extender, and the monohydric alcohol are within the range of about 0.99:1 to about 1.06:1 and preferably within the range of 1.01:1 to 1.03:1. The proportion of equivalents of polymeric diol to equivalents of diol extender is advantageously within the range of about 0.5:1 to 2:1 and preferably within the range of 0.60:1 to 1.1 depending on the desired hardness of the finished polymer.

Further, the proportion of monohydric alcohol is so chosen that the ratio of equivalents of said monohydric alcohol to equivalents of diisocyanate is within the range of about 0.10:1 to about 0.01:1. Preferably the proportion of equivalents of monohydric alcohol to diisocyanate is within the range of 0.05:1 to 0.02:1. The exact proportion of monohydric alcohol required in any given instance will be a function of the nature and proportion of the other polyol components employed in the particular system. The most appropriate proportion in any given instance can be determined readily by a process of trial and error.

As set forth above, the polyurethane elastomers of the invention are preferably made by the one-shot procedure and most preferably by a continuous one-shot procedure. In such procedures the reactants are brought together either as individual reactants or, advantageously, after preblending of one or more components. Illustratively, the various polyol components are preblended prior to admixture with the diisocyanate. The monohydric alcohol employed as chain terminator can be preblended with the polyol components, added separately, or, in a particular embodiment which has been found to give advantageous results, preblended with the diisocyanate. The mixing of the various reactants, whether preblended or not, is accomplished by any of the procedures, and using any of the apparatus, conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C) and the resulting mixture is then heated to a temperature of the order of about 40° C to about 130° C, preferably to a temperature of about 90° C to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C to about 115° C. The time required for curing will vary with the temperature of curing and also with the nature of the particular composition. The time required in any given case can be determined by a process of trial and error.

It is frequently desirable but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pp. 228-232; see also, Britain et al., J. Applied Polymer Science, 4, 207-211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate, and the like. Representative tertiary organic amine catalyts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2 percent by weight based on total weight of the reactants.

When the compositions of the invention are prepared by the less preferred prepolymer method, the diisocyanate, the polymeric diol and, optionally, the monohydric alcohol are reacted, in the presence of a catalyst if desired, in a preliminary stage to form an isocyanate-terminated prepolymer. The proportions of diisocyanate, polymeric diol and monohydric alcohol employed in the preparation of this prepolymer are consistent with the ranges defined above. The reactants are preferably rendered substantially free from the presence of extraneous moisture, using the methods described above, before the formation of the prepolymer is carried out. The formation of the prepolymer is advantageously carried out at a temperature within the range of about 70° C to about 130° C under an inert atmosphere such as nitrogen gas in accordance with conventional procedures. The prepolymer so formed can then be reacted, at any desired time, with the extender diol (and with the monohydric alcohol if it has not been incorporated into the prepolymer) to form the elastomers of the invention. This reaction is carried out advantageously within the range of reaction temperatures specified above for the one-shot procedure. In general the prepolymer and the extender are mixed and heated within the requisite temperature range while the mixture is degassed as described previously. The degassed mixture is then transferred to a suitable mold, extrusion apparatus, or the like, and cured as described for the one-shot procedure.

As set forth above, the elastomers of the invention can be incorporated into solutions which are stable on storage at ambient temperatures and which can contain up to about 50 percent by weight of elastomer. Thus, it has been found that, although the elastomers themselves when prepared and isolated as described above are not soluble to any significant extent in organic polar solvents, the elastomers can be heated to a temperature in the range of about 100° C to 180° C in the presence of organic polar solvent having a boiling point higher than the temperature to which the mixture is to be heated, and thereupon pass into solution in the solvent. Advantageously, the solvent is employed in an amount at least equal by weight to the amount of elastomer. Preferably, the solvent is used in an amount by weight in excess of the amount of elastomer to be dissolved. The resulting solution upon cooling to ambient temperature shows no tendency to deposit solid provided the concentration of elastomer is within the range set forth above.

Illustrative of polar organic solvents having boiling points of at least about 100° C which can be employed in the above process are Cellosolve acetate, methyl Cellosolve acetate, butyl Cellosolve acetate, ethyl Carbitol acetate (diethylene glycol monoethyl ether acetate), butyl Carbitol acetate (diethylene glycol monobutyl ether acetate), diethylene glycol monomethyl ether, diethylene glycol monoethyl ether, diethylene glycol monobutyl ether, diethylene glycol monoisobutyl ether, diisobutyl ketone, cyclohexanone, diacetone alcohol, ethyl amyl ketone, ethyl lactate, and the like. If desired, minor amounts of solvents such as ethyl acetate, butyl acetate, isopropyl acetate and the like having boiling points lower than 100° C, can be added provided the boiling point of the mixed solvents does not fall below the desired level.

The solutions of polyurethane so obtained can be diluted, if desired, to adjust the viscosity to an appropriate range depending upon the particular application for which the coating compositions are to be employed, by lower boiling solvents such as tetrahydrofuran, ethyl acetate, isopropyl acetate, butyl acetate, isopropanol, ethanol, butanol, acetone, methyl ethyl ketone and the like solvents commonly employed in formulation of lacquers and like coating compositions.

In a particular embodiment of the invention the lower boiling organic solvent employed in preparing the coating compositions of the invention comprises a minor amount, of the order of about 5 to about 15 percent by weight based on total weight of the composition, of a lower aliphatic alcohol such as methanol, propanol, ethanol, isopropyl alcohol, butanol, hexanol and the like.

If desired, other diluents commonly employed in the coating art such as water, toluene, benzene, xylene, naphtha and the like can be added in minor proportions to the coating compositions of the invention.

In the majority of cases the softening points of the elastomers lie within the range of temperature quoted above at which the solubilizing step is accomplished, but in certain cases the elastomers have much higher softening points. However, the latter elastomers are readily plasticized by the organic solvents at the operating temperatures discussed above and pass into solution.

In general, the concentration of elastomer in the final solution is so chosen that the viscosity of the solution lies within the range of 1000 cps. to about 10,000 cps. This is a particularly suitable viscosity range where the coating compositions are to be applied as sealants, paints and the like. Somewhat different viscosity considerations may apply for other uses of the solutions.

If desired, any of the additives conventionally employed in the elastomer and/or coating arts may be incorporated either in the reaction mixture used to form the original elastomer or into the final solution obtained as described above. Such additives include fillers, pigments such as titanium oxide, lubricants, antioxidants, flame retardants such as antimony oxide, alumina hydrate, zinc oxide, and the like.

The solutions obtained as described above, when applied as coatings on exterior surfaces such as roofs, walls, and the like, give rise to polyurethane elastomeric films having excellent strength and elasticity as will be more apparent from the data set forth in the examples below.

The following examples describe the manner and process of making and using the invention and set forth the best mode contemplated by the inventors of carrying out the invention, but are not to be construed as limiting.

EXAMPLE 1

This example shows the effect of the NCO/OH ratio used in making typical polyurethane elastomers, in the absence of a monohydric alcohol in accordance with the invention, on the solubility of said elastomers in typical coating solvents.

A series of elastomers (A-G) was prepared, using varying NCO/OH ratios, from 4,4'-methylenebis(phenyl isocyanate) and a polyol blend using the proportions shown in TABLE I below. The polyol blend had an overall equivalent weight of 275 and was prepared as follows. A mixture of 1877.4 g. (3.6 equivalents) of a polyoxyethylenepolyoxypropylene glycol having 50% primary hydroxyl groups (equivalent wt. = 521.5), 524 g. (4 equivalents) of dibromoneopentyl glycol and 100.5 g. (1.5 equivalents) of dipropylene glycol was heated at 85° C under a pressure of 2 mm. of mercury for 2.5 hrs. and then cooled to ambient temperature (circa 20° C) and maintained under nitrogen during subsequent handling.

The various Elastomers A-G were each prepared using a 275 g. aliquot of the above polyol blend. To the polyol, heated to 80° C, was added 0.08 g. of stannous octoate followed by the required amount (shown in TABLE I) of 4,4'-methylenebis(phenyl isocyanate) which had been preheated to 50° C. The mixture was vigorously agitated until a clear solution was obtained and was then cast on a tray. The resulting polyurethane elastomer was cured for 16 hours at 70° C and then crushed. The solubility of each elastomer in a mixture of Cellosolve acetate and ethyl acetate was then investigated as follows. A 50 g. portion of each crushed elastomer was heated under reflux (temperature of refluxing mixture = circa 100° C) in a mixture of 50 g. of Cellosolve acetate and 25 g. of ethylacetate. It was found that Elastomers A, B and G showed no sign of dissolving even after 6 hours of refluxing. Elastomer C was not completely dissolved after 6 hours of heating, whereas Elastomers D, E and F dissolved readily after a short period (less than 1 hour) of refluxing.

TABLE I shows the amounts of polyol blend and diisocyanate used to make the various Elastomers A-G, the NCO/OH ratio and the softening points of the various Elastomers.

TABLE I

| Elastomer | Wt. (g.) Polyol blend | Wt. (g.) Diisocyanate | NCO/OH | Softening Point (° C) |
|---|---|---|---|---|
| A | 275 | 125.5 | 1.0 | 180 |
| B | 275 | 121.7 | 0.97 | 160 |
| C | 275 | 119.2 | 0.95 | 135 |
| D | 275 | 116.7 | 0.93 | 110 |
| E | 275 | 114.2 | 0.91 | 65 |
| F | 275 | 110.4 | 0.88 | 40 |
| G | 275 | 129.3 | 1.03 | 190 |

The hardness of each of the various elastomers was in the range of 40-45 Shore D.

EXAMPLE 2

This example shows the effect on solubility of the use of a monohydric alcohol in the preparation of a series of Elastomers H-L employing NCO/OH indices from 0.95 to 1.05 using the same reactants as for Elastomers A-G of Example 1 save for the presence of the monohydric alcohol.

The same polyol blend as described in Example 1 was prepared exactly as described therein but 27 g. (0.45 equivalents) of n-propyl alcohol was added to the blend, with agitation, after the blend had been vacuum dried and cooled to ambient temperature. The Elastomers H-L were prepared exactly as described in Example 1 using the amounts of polyol blend and 4,4'-methylenebis(phenyl isocyanate) shown in Table II.

TABLE II

| Elastomer | Wt. (g.) Polyol blend | Wt. (g.) Diisocyanate | NCO/OH | Softening Point (° C) |
|---|---|---|---|---|
| H | 265.1 | 119.2 | 0.95 | 55 |
| I | 265.1 | 123.0 | 0.98 | 75 |
| J | 265.1 | 125.5 | 1.0 | 120 |
| K | 265.1 | 129.3 | 1.03 | 140 |
| L | 265.1 | 131.8 | 1.05 | 145 |

Each of Elastomers H–L was crushed and 50 g. of the crushed material was heated under reflux with a mixture of 50 g. of Cellosolve acetate and 25 g. of ethyl acetate. In direct contrast to Elastomers A, B, C and G (NCO/OH indexes corresponding to those of Elastomers J, I, H and K, respectively) all of Elastomers H–L dissolved very readily (less than 1 hour heating) in the solvent mixture. Films were cast from a portion of each solution and dried in vacuo. Physical properties of the films were tested and are shown in TABLE III below together with the viscosities of the various solutions.

TABLE III

| Elastomer | Viscosity (cps. at 25° C) of solution | Film Properties | | |
|---|---|---|---|---|
| | | Thickness (in.) | Tensile (psi) | Elongation at break (%) |
| H | 712 | 0.0082 | 400 | >1100 |
| I | 2500 | 0.0080 | 730 | 980 |
| J | 4800 | 0.0088 | 1470 | 830 |
| K | 16750 | 0.0086 | 2320 | 710 |
| L | 9000 | 0.0085 | 2350 | 610 |

Samples of the films from Elastomers J, K and L were stretched manually to the breaking point and each showed a blush, evidencing crystallinity, immediately prior to breaking.

EXAMPLE 3

A coating composition in accordance with the invention was prepared as follows.

An isocyanate-terminated prepolymer was prepared by blending 228 parts by weight (0.437 equivalents) of the polyoxyethylenepolyoxypropylene glycol employed in Example 1 with 41 parts by weight (0.61 equivalents) of dipropylene glycol and drying the mixture at 85° C under vacuum before adding the blend, with agitation at 60° C over a period of 1 hour, to 500 parts by weight (3.98 equivalents) of 4,4'-methylenebis(phenyl isocyanate). After the addition was complete, the reaction mixture was maintained at 60° C with stirring for a further hour before being allowed to cool to room temperature (circa 20° C).

A polyol blend of 542 parts by weight (1.04 equivalents) of the same polyoxyethylenepolyoxypropylene glycol used to make the prepolymer, 213 parts by weight (1.62 equivalents) of dibromoneopentyl glycol and 1.5 parts by weight of antioxidant (butylated hydroxy toluene), was heated at 85° C under vacuum for 4 hours before being cooled to room temperature. To the cooled mixture was added, with agitation, a total of 13.125 parts by weight (0.146 equivalents) of ethylene glycol monoethyl ether.

A mixture of 100 parts by weight of the polyol blend so prepared and 0.04 parts by weight of stannous octoate preheated to 110° F was then admixed with vigorous agitation with 100 parts by weight of the isocyanate-terminated prepolymer prepared as described above and preheated to 110° F and the resulting mixture was cast in a tray. The cast elastomer was cured at 70° C for 20 hours before being ground to a powder using a granulator. A total of 200 parts by weight of the ground elastomer was mixed with 300 parts by weight of Cellosolve acetate and 1 part by weight of an epoxy color stabilizer. The mixture was heated to 155° C and held at that temperature for 3 hours. The resulting clear solution was cooled to 70° C and was then diluted with 300 parts by weight of isopropyl acetate and 20 parts by weight of isopropyl alcohol to yield a coating composition in accordance with the invention. A sample of the solution prior to diluting with the latter solvents had a viscosity of 22,000 cps. at 25° C. The final coating composition, after addition of diluents, had a viscosity of 840 cps. at 25° C.

EXAMPLE 4

A coating composition in accordance with the invention was prepared as follows.

A polyol blend of 901.8 g. (1.8 equivalents) of a polyoxypropylene glycol of molecular weight 1000 and 264 g. (2 equivalents) of dibromoneopentyl glycol was dried by heating at 80° C in vacuo for 2 hours.

A mixture of 495.7 g. (3.95 equivalents) of 4,4'-methylenebis(phenyl isocyanate) and 2.81 g. (0.038 equivalents) of 1-butanol was heated at 50° C for 3 hours. A portion (131.2 g.) of the resulting mixture was then added, with vigorous agitation, to a portion (306.8 g.) of the above polyol blend to which had been added 0.09 g. of stannous octoate. The resulting mixture was poured into a tray and cured by heating at 70° C for 20 hours. The resulting elastomer, which had a hardness of 45 Shore D, was chopped into granules and heated with 657 g. of Cellosolve acetate at 155° C until a clear solution was obtained (about 1 hour heating). The resulting coating composition, containing 40% w/w of elastomer, had a viscosity of 14,900 cps. at 25° C. A film was cast from this solution and found to have a tensile strength of 2100 psi and an elongation at break of 820%.

EXAMPLE 5

A coating composition in accordance with the invention was prepared as follows.

A mixture of 400 g. (1.45 equivalents) of the polyol blend prepared as described in Example 1, 9.87 g. (0.076 equivalents) of 2-hydroxyethyl methacrylate and 0.17 g. of stannous octoate was heated to 79° C and admixed, with vigorous agitation, with 190 g. (1.514 equivalents) of 4,4'-methylenebis(phenyl isocyanate) preheated to 50° C. The resulting mixture was cast in an aluminum pie plate and cured by heating at 75° C for 20 hours. The resulting elastomer was granulated. A total of 240 g. of the granulated polymer was heated under reflux with a mixture of 240 g. of Cellosolve acetate and 120 g. of ethyl acetate until a clear solution was obtained (3 hours heating). The resulting solution was cooled to room temperature to give a coating composition having a viscosity of 2880 cps. at 23° C.

EXAMPLE 6

The procedure described in Example 5 was repeated exactly as described except that the 2-hydroxyethyl methacrylate there used was replaced by a mixture of 4.58 g. (0.05 equivalents) of ethylene glycol monoethyl ether and 5.91 g. (0.025 equivalents) of 3,5-di-t-butyl-4-hydroxybenzyl alcohol (Antioxidant 754). The resulting elastomer was granulated and 320 g. of the granulated elastomer was heated under reflux with a mixture of 320 g. of Cellosolve acetate and 160 g. of ethyl acetate until a clear solution was obtained (4 hours heating) to give a coating composition according to the invention.

I claim:

1. A coating composition which comprises the product obtained by heating, at a temperature in the range of about 100° C to about 180° C in the presence of an organic polar solvent having a boiling point not less than the temperature employed in said heating step, a polyurethane elastomer consisting essentially of the product of reaction in the absence of solvent of (a) 4,4'-methylenebis(phenyl isocyanate);
(b) a polyol having a molecular weight in the range of about 750 to about 2000 and being selected from the class consisting of polyester diols and polyether diols;
(c) an aliphatic diol extender; and
(d) a monohydric alcohol having a molecular weight in the range of about 32 to 324.8 wherein the ratio of equivalents of isocyanate to total equivalents of hydroxyl in the components (b), (c) and (d) is within the range of 0.99:1 to 1.06:1 and wherein the proportion of equivalents of component (d) to equivalents of component (a) is within the range of about 0.10:1 to about 0.01:1;
until a homogeneous solution is obtained and thereafter cooling the product.

2. The coating composition of claim 1 wherein the organic polar solvent is 2-ethoxyethyl acetate.

3. The coating composition of claim 2 wherein the organic polar organic solvent also comprises a minor amount of ethyl acetate.

4. The coating composition of claim 1 wherein there is added to the cooled solution an amount of a lower-alkanol in excess of that required to react with any free isocyanate groups in the polyurethane elastomer.

5. A coating composition which comprises the product obtained by heating, at a temperature in the range of about 100° C to about 180° C in the presence of a polar organic solvent having a boiling point not less than the temperature employed in the heating step, a polyurethane elastomer which consists essentially of the product of reaction in the absence of solvent of
(a) 4,4'-methylenebis(phenyl isocyanate)
(b) a polyether glycol having a molecular weight of about 1000;
(c) an aliphatic diol extender; and
(d) from about 0.01 to about 0.1 equivalents, per equivalent of said diisocyanate, of a monohydric alcohol having a molecular weight in the range of about 32 to 324.8;
the proportion of equivalents of isocyanate to total equivalents of hydroxyl in components (b),
(c) and (d) being within the range of 0.99:1 to 1.06:1;
until a homogeneous solution is obtained and thereafter cooling the product.

6. The product of claim 5 wherein the monohydric alcohol employed in the preparation of said elastomer is butanol.

7. The product of claim 5 wherein the monohydric alcohol employed in the preparation of said elastomer in propanol.

8. The product of claim 5 wherein the monohydric alcohol employed in the preparation of said elastomer is ethylene glycol monoethyl ether.

9. The product of claim 5 wherein the monohydric alcohol employed in the preparation of said elastomer is 2-hydroxyethyl methyacrylate.

10. The product of claim 5 wherein the monohydric alcohol employed in the preparation of said elastomer is 3,5-di-t-butyl-4-hydroxybenzyl alcohol.

11. The product of claim 5 wherein the aliphatic diol extender employed in the preparation of said elastomer is dibromoneopentyl glycol.

12. The product of claim 6 wherein the aliphatic diol extender employed in the preparation of said elastomer is a mixture of dibromoneopentyl glycol and dipropylene glycol.

13. The product of claim 5 wherein the polar organic solvent is 2-ethoxyethyl acetate.

14. The product of claim 13 wherein said polar organic solvent also comprises a minor amount of ethyl acetate.

* * * * *

UNITED STATES PATENT OFFICE
CERTIFICATE OF CORRECTION

Patent No. 4,083,815                     Dated April 11, 1978

Inventor(s) Edward J. Thompson

It is certified that error appears in the above-identified patent and that said Letters Patent are hereby corrected as shown below:

Abstract: line 7                         Should read:

"polyester of polyether"                 -- polyester or polyether --

Column 4, line 55:                       Should read:

"1.1"                                    -- 1:1 --.

Column 12, claim 12, line 28:            Should read:

"The product of claim 6"                 -- The product of claim 5 --

Signed and Sealed this

Fifth Day of September 1978

[SEAL]

Attest:

RUTH C. MASON
*Attesting Officer*

DONALD W. BANNER
*Commissioner of Patents and Trademarks*